United States Patent
May et al.

[15] 3,666,841
[45] May 30, 1972

[54] ARYL-POLYOL PHOSPHITE HAVING TERMINAL HALIDE GROUPS

[72] Inventors: Walter R. May, St. Louis, Mo.; Dudley Bruce Merrifield, Williamsville, N.Y.; Lewis Bsharah, St. Louis, Mo.

[73] Assignee: Petrolite Corporation, Wilmington, Del.

[22] Filed: Mar. 10, 1969

[21] Appl. No.: 808,035

Related U.S. Application Data

[63] Continuation-in-part of Ser. No. 727,322, May 7, 1968, abandoned.

[52] U.S. Cl. ................260/950, 260/45.7 P, 260/814, 260/976
[51] Int. Cl. ....................................C07f 9/12, C08f 45/58
[58] Field of Search..................................260/950

*Primary Examiner*—Alex Mazel
*Assistant Examiner*—Anton H. Sutto
*Attorney*—Sidney B. Ring

[57] ABSTRACT

Aryl-polyol phosphites having terminal halide groups and their use as rubber stabilizers and/or anti-oxidants. The preferred embodiments are aryl-glycol phosphites having terminal halide groups.

8 Claims, No Drawings

ARYL-POLYOL PHOSPHITE HAVING TERMINAL HALIDE GROUPS

This invention is a continuation-in-part of Ser. No. 727,322 filed May 7, 1968, now abandoned.

This invention relates to aryl-polyol phosphites having terminal halide groups and to their use as rubber stabilizers and/or antioxidants.

Triaryl phosphites are known as rubber stabilizers. For example, U.S. Pat. No. 2,419,354 describes the use of triphenyl phosphites and tri- (lower alkyl-phenyl) phosphites as rubber stabilizers, and U.S. Pat. No. 2,733,226 describes the use of tri- (higher alkylaryl phosphites) for such use. Although these compositions have excellent properties, they have certain deficiencies.

Since the above tri-aryl phosphites are employed in aqueous systems, they must be emulsified, such emulsification being effected by the use of suitable emulsifiers. In addition these tri-aryl phosphites are relatively expensive.

We have in Ser. No. 727,322, described and claimed aryl-polyol phosphites which are employed as rubber stabilizers and/or anti-oxidants. Since these phosphites contain polyol groups, they have built-in surfactant units which facilitate the formation of emulsions. In addition, they are less expensive than the corresponding triaryl phosphites.

The aryl-polyol phosphites of Ser. No. 727,322 are esters of phosphorous acids or their equivalents which contain at least one aryl and one polyol group. They may be illustrated by one of the following type compounds:

I        $[ArO-]_xP-[(OA)_nOH]_y$ where $x$ and $y$ are each 1–2 and the sum of $x + y = 3$ where Ar is an aryl group and OA is derived from an alkylene oxide.

II 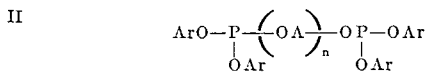

In addition, some of the Ar group may be glycol derived moieties, i.e., $(OA)_nOH$ in place of OAr in Formula II.

III 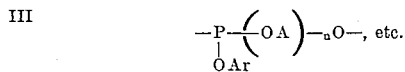

where the Ar's are aryl groups, which may be the same or different, and $-(OA)_n-$ is the moiety of a polyalkylene-ether glycol having n polyalkylene-ether units, for example for about 1 to 500 units or more, such as from about 2 to 250 units, for example from about 3 to 200 units, but preferably from about 3 to 20 units. The optimum amount will vary with the type of oxides employed, the aryl groups, the rubber, the system, etc.

The following example illustrates, without limitation, a convenient method of preparing the compositions of Ser. No. 727,322.

EXAMPLE 1

Two moles of nonylphenol are placed in a reaction flask with 1 mole of phosphorous trichloride. The reaction flask is fitted with a stirrer, thermometer, condenser and connections for $N_2$ sweep. The $N_2$ flow is started and the reaction mixture is heated to 170° C. and stirred for 4 hours. Then, 1 mole of the glycol is added. Heating and stirring are continued for another one-half hour or until no more HCl is swept out of the reaction flask by the $N_2$. The reaction mixture may be heated to 170° C. or more. The product is then cooled and removed from the reaction flask. Absence of acid reaction with litmus paper indicates complete reaction of the $PCl_3$.

Since other suitable compounds are similarly prepared, they are presented in the following table:

TABLE I

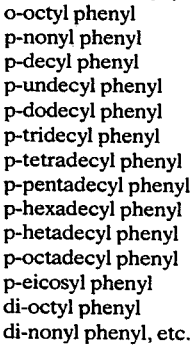

| Ex. | $Ar_1$ | $Ar_2$ | $(OA_1)_{n'}$ | $(OA_1)_nOH$ $(OA_2)_{n''}$ |
|---|---|---|---|---|
| 1 | Nonylphenyl | Nonylphenyl | 3 EtO | |
| 2 | ..do.. | ..do.. | 22 EtO | |
| 3 | ..do.. | ..do.. | 35 EtO | |
| 4 | ..do.. | ..do.. | 6 EtO | |
| 5 | ..do.. | ..do.. | 204 EtO | |
| 6 | ..do.. | ..do.. | 6 EtO | |
| 7 | ..do.. | ..do.. | 17 PrO | |
| 8 | ..do.. | ..do.. | 34 PrO | |
| 9 | Octylphenyl | Octylphenyl | 3 EtO | 15 PrO |
| 10 | Dodecylphenyl | Dodecylphenyl | 20 EtO | 25 PrO |
| 11 | Octylphenyl | Nonylphenyl | 12 PrO | 20 EtO |
| 12 | (p-Nonyl phenyl-O-)$_2$-P-(OEt)$_{15}$-O-P-(O-phenyl nonyl-p)$_2$ | | | |
| 13 | (P-Nonyl phenyl-O-)$_2$-P-(OPr)$_{10}$-O-P-(O-phenyl nonyl-p)$_2$ | | | |

We have now discovered that an improved product can be obtained when the phosphite moiety such as the phosphorous trihalide is added to a mixture of the alkylene oxide moiety such as glycol or polyglycol and the alkyl aryl moiety such as the alkyl phenol, the glycol and the alkyl phenol being premixed. This product is not only an excellent rubber stabilizer and/or anti-oxidant but despite its slight solubility (0.1 percent or less) has the ability to self-disperse itself readily in water which avoids the necessity of employing emulsifiers and/or vigorous stirring to emulsifier as is true with other rubber stabilizers and/or anti-oxidants.

The product of this invention is predominantly $$(ArO)_2P(OA)_nCl$$

where Ar and A having the same meaning as in Ser. No. 727,322.

Although we do not wish to be bound by theoretical considerations it is believed that byproducts are also formed which do not impede the anti-oxidant properties of the resulting mixture, when it is employed in rubber. These byproducts are probably the following:

$P(OAr)_3$
$P(OAr)(OA)_nX$
$P[(OA)_nX]_3$
$Cl(OA)_nOAX$, etc. n where X is a halide, preferably chlorine.

As in Ser. No. 727,322 the aryl moiety of the phosphite ester may be any of those aryl moieties described in U.S. Pat. Nos. 2,419,354 and 2,733,226. The following are illustrative examples phenyl,
alkylphenyl,
dialkyl-phenyl, where the alkyl group is either lower or higher alkyl, for example having from one to 18 or more carbon atoms, straight chain or branched, but preferably eight to 12 carbon atoms.

Examples of the alkyl group (which may be ortho-, meta- or para- to the phenyl group) include the following: methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, etc. (which may be branched or straight chained). The remaining groups on the phenyl may be unsubstituted or substituted with relatively inert groups such as halogen, etc. The aryl groups may be the same or different.

Examples of alkyl phenyls include the following:

o-octyl phenyl
p-nonyl phenyl
p-decyl phenyl
p-undecyl phenyl
p-dodecyl phenyl
p-tridecyl phenyl
p-tetradecyl phenyl
p-pentadecyl phenyl
p-hexadecyl phenyl
p-hetadecyl phenyl
p-octadecyl phenyl
p-eicosyl phenyl
di-octyl phenyl
di-nonyl phenyl, etc.

All of the phenyl groups of the phosphite esters may be the same or different.

As in Ser. No. 727,322 the polyol is in general any suitable oxyalkylatable material. In the preferable embodiment the polyol is a glycol which may be considered as oxyalkylated water, i.e., $H(OA)_nOH$.

$(OA)_n$ is derived from any suitable 1,2 alkylene oxide, for example, alkylene oxides of the formula

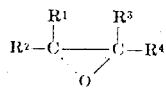

where $R^1$, $R^2$, $R^3$, $R^4$ are hydrogen or a substituted group, for example alkyl, cycloalkyl, aryl, etc., for example, ethylene oxide, propylene oxide, butylene oxide, amylene oxide, octylene oxide, styrene oxide, methylstyrene oxide, cyclohexene oxide (where $R^1$ and $R^3$ are joined to form a ring), etc.

Equivalents of alkylene oxides can also be employed, for example alkylene carbonates, i.e., ethylene carbonate, propylene carbonate, butylene carbonate, etc. In addition alkylene oxides of the glycide, methyl glycide, etc. type and their equivalents can also be employed.

$(OA)_n$ denotes (1) homo units, for example $—(OEt)_n—$, $—(OPr)_n—$, $—(OBu)_n—$, $—O\ Octyl)_n—$,

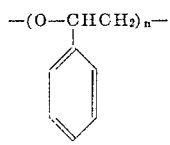

etc., (2) block units, $—(OEt)_a(OPr)_b—$,
$—(OEt)_a(OBu)_b—$, $—(OPr)_a(OPr)_c—$, $—(OEt)_a(OPr)_b(OBu)_c—$,

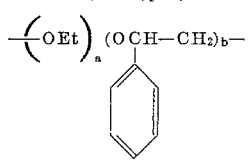

etc.
where $a + b + c = n$; (3) hetero units containing groups which are random mixtures of more than one oxide $+OEt—OPr)_n—$, $+OPr—OBu)_n—$, $+OEt—OBu)_n—$, wherein the ratio of each oxide to the other is for example 1–99 to 99–1; (4) hetero-homo units for example $+EtO)_a(EtO—PrO)_b—$, $+EtO)_a(PrO)_b(EtO—PrO)_c—$, $+EtO—PrO)_a(BuO)_b—$ The variations are obviously limitless.

The following example is presented for purposes of illustration and not of limitation. In contrast to the two step process of Example 1 of Ser. No. 727,322, in the present process $PCl_3$ is added to a mixture of the aryl phenol and the glycol.

EXAMPLE 2

To a vessel containing a stirred mixture of 2 moles of nonylphenol and 1 mole of ethylene glycol was added 1.3 mole of $PCl_3$ over a period of 1.5 hours at a temperature of 45°–55° C. Upon completion of the addition, the reaction mixture is heated to 100°–110° C. for about 1 hour to drive off HCl. Then a vacuum is applied for 1 hour at 120° C. to remove the last traces of HCl. The product is predominantly

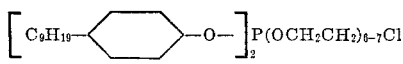

The resulting product without further purification is employed directly as the anti-oxidant.

To further illustrate the reaction, the reactants specified in Examples 1–11 of Table I above are reacted in the manner of Example 2 to yield analogous products where the resulting product instead of having the formula in Table I has the formula

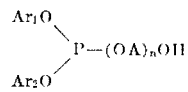

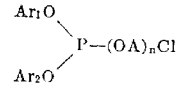

In general, the reaction is carried out by adding 2 moles of the phenol, 1 mole of the glycol and 1 mole of $PCl_3$. Generally a slight excess of $PCl_3$ is preferred such as about 2 M phenol to 1 M glycol to 1.1–1.5 M $PCl_3$. The initial reaction period is generally 1–3 hr. at a temperature of about 25°–75° C. but preferably 45°–55° C. The removal of HCl is generally carried out at reduced pressure and at a temperature below 160° C. and most preferably at 100°–120°C.

The phosphite esters of this invention are employed in amounts sufficient to act as stabilizers and/or anti-oxidants. Suitable amounts will vary with the particular phosphite and/or the particular rubber. They may be incorporated in minor amounts, for example from about 0.25 to about 5 or more parts of phosphite esters based on 100 parts by weight of rubber such as from 0.5 to 4 parts for example from 1 to 3 parts, but preferably from about 1.5–2 parts.

Emulsions prepared from the phosphite ester having terminal halides are incorporated into a sufficient quantity of SBR latex to provide about one part of phosphite ester per 100 parts of synthetic rubber to yield to improved rubbers of the present invention. Unlike commercial anti-oxidants the compounds of this invention are emulsified by stirring without the use of an emulsifier, i.e., they have "built-in" emulsification properties.

The following is an example of a commercial preparation, prepared with the products of this invention employed as antioxidants.

EXAMPLE A

| | |
|---|---|
| SBR-1500 Rubber | 100.0 |
| HAF Carbon Black (Philblack-O) | 50.0 |
| Zinc Oxide | 5.0 |
| Stearic Acid | 2.0 |
| Rosin 731 (softener) | 5.0 |
| Accelerator (benzothiazole-2-cyclohexylsulfonamide) | 1.2 |
| Sulfur | 1.75 |
| Antioxidant of this Invention | 1.0 |

Cured at 144° C., 292° F. for 60 min.

The antioxidant-containing rubber yielded an oxidation-resistant rubber which was also inhibited against flex cracking and ozone attack.

EXAMPLE B

The rubber samples were prepared from commercially available SBR-1500 styrene butadiene latex. The phosphite esters of this invention were employed in amounts sufficient to act as stabilizers and/or antioxidants. Dispersions of these phosphite esters are prepared by directly stirring these materials in water in contrast to the commercial antioxidant which required an emulsifier. No emulsifiers or dispersing agents are required when used in latex systems. The latex emulsion containing the dispersed phosphite ester was coagulated by the salt acid method and dried at 60° C.

A comparison of the phosphate ester in SBR-1500 styrene butadiene rubber with a similar type commercial antioxidant was made by subjecting the stocks containing these antioxidants to air oven and oxygen bomb aging according with ASTM D412, D572, D573, and D676 test. The results of these tests show that the phosphite esters demonstrate excellent antioxidant effectiveness. The recipes used were as follows:

| | |
|---|---|
| SBR-1500 | 100.0 |
| EPC Black | 40.0 |
| Zinc Oxide | 5.0 |
| Stearic Acid | 1.5 |
| Sulfur | 2.0 |
| Benzothiazyl disulfide | 3.0 |
| Antioxidant (Example 2) | 1.0 |

50 minute cure at 302° F.

The aqueous emulsion of these phosphites can be added not only to aqueous emulsions or dispersions of 1,3-butadiene-styrene copolymer rubber (SBR), but also to stabilize emulsions or dispersions of conjugated diene polymerizate rubbers generally, which would also include such as 1,3-butadiene-acrylonitrile, 1,3-butadiene-vinyltoluene, 1,3-butadiene-methyl methacrylate, 1,3-butadiene-methyl acrylate, 1,3-butadiene-vinyl pyridine, polybutadiene, and polyisoprene.

These antioxidants can also be employed in natural rubbers.

The phosphite esters of this invention may be used with or without other preservatives or with fillers, accelerators, vulcanizing agents, or compounding ingredients of any desired sort known to the art. The components of the rubber compositions may be used in various ratios and it is not intended to limit the invention to the amounts of ingredients indicated in the examples given.

The invention may be used in the manufacture of tubes, hose, wire insulation, boots, shoes, surgical instruments, drug sundries, dipped synthetic rubber articles, vehicle tires, coating compositions, etc.

It is evident to those skilled in the art that various modifications can be made in the invention herein described without departing from the spirit of the invention and such modifications are considered as part of this invention.

Having thus described our invention, what we claim as new and desire to obtain by Letters Patent is:

1. An aryl-polyol phosphite of the formula

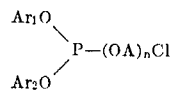

wherein
 $Ar_1$ is phenyl, alkyl phenyl, or dialkyl phenyl with the alkyl group having one to 18 carbon atoms,
 $Ar_2$ is phenyl, alkyl phenyl, or dialkyl phenyl with the alkyl group having one to 18 carbon atoms, with the proviso that $Ar_1$ and $Ar_2$ can be the same or different,
 OA is derived from ethylene oxide, propylene oxide, butylene oxide, amylene oxide, octylene oxide, styrene oxide, methylstyrene oxide, cyclohexene oxide, or mixtures thereof, and
 $n$ is 1 to 500.

2. The aryl-polyol phosphite of claim 1 wherein $Ar_1$ is alkyl phenyl and $Ar_2$ is alkyl phenyl and $Ar_1$ and $Ar_2$ are the same.

3. The aryl-polyol phosphite of claim 1 wherein $Ar_1$ is alkyl phenyl and $Ar_2$ is alkyl phenyl and $Ar_1$ and $Ar_2$ are different.

4. The aryl-polyol phosphite of claim 2 wherein OA is derived from ethylene oxide, propylene oxide or a mixture of ethylene oxide and propylene oxide.

5. The aryl-polyol phosphite of claim 4 wherein the alkyl group has eight to 12 carbon atoms.

6. The aryl-polyol phosphite of claim 5 wherein $n$ is 1–200.

7. The aryl-polyol phosphite of claim 6 wherein alkyl is nonyl.

8. The aryl-polyol phosphite of claim 7 of the formula

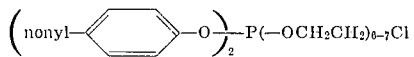

* * * * *